United States Patent [19]

Dworak et al.

[11] Patent Number: 4,716,869
[45] Date of Patent: Jan. 5, 1988

[54] VALVE GUIDE FOR AN INTERNAL COMBUSTION ENGINE

[75] Inventors: Ulf Dworak, Baltmannsweiler; Hans Olapinski, Aichwald; Dieter Fingerle, Hochdorf; Ulrich Krohn, Leonberg, all of Fed. Rep. of Germany

[73] Assignee: Feldmühle Aktiengesellschaft, Duesseldorf, Fed. Rep. of Germany

[21] Appl. No.: 892,582

[22] Filed: Aug. 1, 1986

Related U.S. Application Data

[63] Continuation-in-part of Ser. No. 803,502, Nov. 27, 1985, abandoned, which is a continuation of Ser. No. 571,479, Jan. 17, 1984, abandoned.

[30] Foreign Application Priority Data

Jan. 21, 1983 [DE] Fed. Rep. of Germany ....... 3301912

[51] Int. Cl.⁴ ............................................... F01L 3/00
[52] U.S. Cl. ............................. 123/188 GC; 428/633; 501/103
[58] Field of Search ................ 428/633; 123/188 GC; 501/103, 105, 104

[56] References Cited

U.S. PATENT DOCUMENTS

| 3,887,387 | 6/1975 | Sturhahn | 106/57 |
| 4,269,903 | 5/1981 | Clingman et al. | 428/633 |
| 4,279,655 | 7/1981 | Garvie et al. | 106/57 |
| 4,495,907 | 1/1985 | Kamo | 123/193 C |

FOREIGN PATENT DOCUMENTS

| 78119 | 6/1980 | Japan | 123/188 GC |
| 115804 | 9/1981 | Japan | 123/188 GC |

OTHER PUBLICATIONS

An Introduction to Zirconia by Dr. R. Stevens, Jun. 1983, pp. 11-17.

Primary Examiner—Craig R. Feinberg
Assistant Examiner—David A. Okonsky
Attorney, Agent, or Firm—Toren, McGeady & Associates

[57] ABSTRACT

A tubularly formed valve guide (1) with a bore for a metal valve shank (2) for use in an internal combustion engine comprising a sintered body of a partially stabilized zirconium oxide having a porosity of less than 3%. Even under extreme stress, e.g., in an outlet valve of a high-power engine, but in particular in the blow-off valve of an exhaust gas turbocharger, the valve guide shows a considerably reduced wear as compared to conventional valve guides.

22 Claims, 1 Drawing Figure

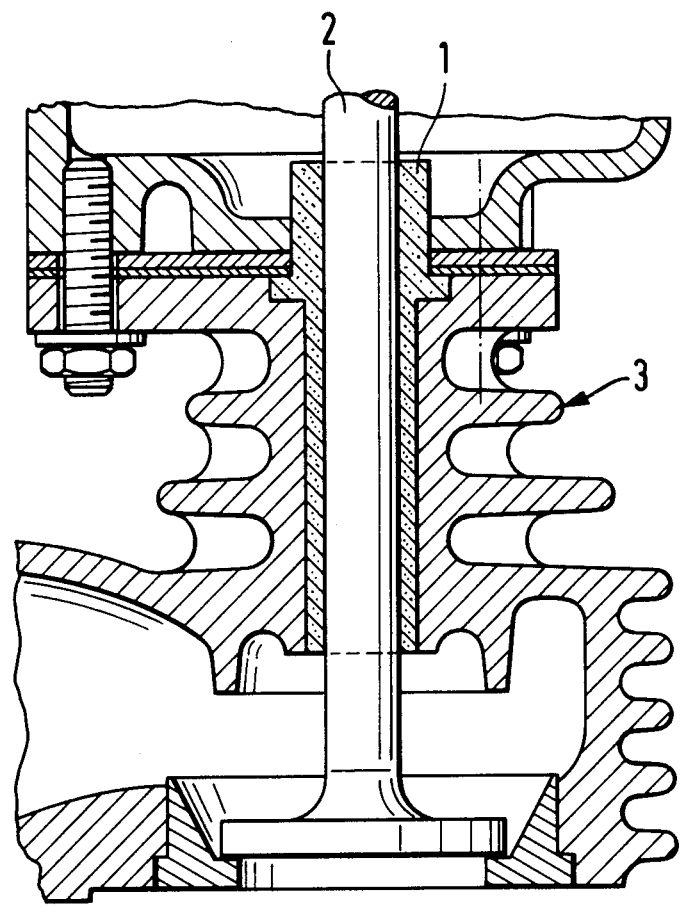

VALVE GUIDE FOR AN INTERNAL COMBUSTION ENGINE

CROSS-REFERENCE TO RELATED APPLICATIONS

This application is a continuation-in-part of copending application Ser. No. 803,502, filed Nov. 27, 1985, and now abandoned, the contents of which are incorporated herein by reference, which, in turn, is a continuation of application Ser. No. 571,479, filed Jan. 17, 1984, now abandoned.

BACKGROUND OF THE INVENTION

1. Field of the Invention

The present invention relates to a tubular valve guide with a bore for a metal valve shank of an internal combustion engine.

2. Description of the Prior Art

Valve guides are subject to extremely high thermal and mechanical stress. As both the guide and valve shank normally consist of metals, the heavy stress may lead to the occurrence of welding, resulting in imprecise operation of the valves. This impairs the functioning of the engine and reduces its life-span. Therefore, the selection of the materials for the manufacture of valve guides and valve shanks is of special importance. DE-OS No. 30 49 154 proposes to replace the known metallic valve guides of Niresist, tin bronze, aluminum bronze or cast iron by a tubular valve guide with a nitrided inner surface and thereby to reduce the wear. However, this is disadvantageous because only the surface of the bore is hardened, but the danger exists that after this hard layer has eroded, much faster wear occurs. Also, this proposal is less suitable for the special problem existing in the blow-off valve of an exhaust gas turbocharger because, in this case, the danger of oxidizing, i.e., the formation of fuel residues, persists. This danger is known to exist especially for metal parts exposed to combustion gases, and, more particularly, in the blow-off valve of an exhaust gas turbocharger, where there are relatively long standstill times between the individual cycles. Inlet and outlet valves or their valve guides, are less endangered in this respect because they are in operation practically without stopping and therefore, residues form in the valve guides to a much lesser degree since minor residues are removed by the continual working of the valves.

Valve guides of silicon carbide and silicon nitride are known from Japanese patent publication No. 55-78119. Silicon carbide has a heat conductivity of approximately 85 to 90 W/(m·K) and a thermal linear expansion coefficient of approximately $4.4 \times 10^{-6}$ $K^{-1}$, while silicon nitride has a heat conductivity of 30 to 40 W/(m·K) and a thermal linear expansion coefficient of $3.2 \times 10^{-6}$ $K^{-1}$. See, for example, the brochures of the Feldmühle Aktiengesellschaft. However, in spite of these favorable values which would lead one to expect a small linear expansion and, at the same time, good dissipation of the heat generated in the valve guides, such valve guides have been unacceptable for use in internal combustion engines in motor vehicles because tests showed that the valve guides broke up after a relatively short time.

SUMMARY OF THE INVENTION

We have discovered a highly wear-resistant valve guide for a metal valve shank which avoids the above-noted disadvantages and shows substantially reduced wear, even under extreme stress as it occurs, e.g., in the outlet valve of a high-power engine or even more so in the blow-off valve of an exhaust gas turbocharger. In particular, the invention eliminates or minimizes the phenomenon similar to welding between the valve shank and valve guide, which always occurs when metallic friction partners work against one another without sufficient lubrication at high speed under thermal stress. Also, the valve guide of the present invention is suitable for the blow-off valve of an exhaust gas turbocharger where the residue formation of the combustion gases is substantially reduced and, even though of higher hardness than the material of the valve shank, does not lead to premature wear of the valve shank due to its surface constitution. Thus, as a whole, the invention provides a valve guide which can be installed in a variety of units of internal combustion engines and which has an extremely high wear resistance thereby lengthening the life of the engine by making possible a much safer and more precise long-term working of the valve.

Very surprisingly, we have discovered that valve guides made from partially stabilized zirconium oxide are well suited and exhibit very good wear resistance as compared to the known valve guides of metallic alloys, although partially stabilized zirconium oxide with 2.5 W(m·K) exhibits considerably poorer heat conductivity than the silicon carbide and silicon nitride proposed for this purpose. Additionally, since the thermal linear expansion coefficient of the partially stabilized zirconium oxide ($8.0 \times 10^{-6}$ $K^{-1}$) is considerably higher than that of silicon carbide and silicon nitride, would expect not only a very low heat dissipation, but also, the formation of cracks in the valve guides due to the high thermal linear expansion stress.

More particularly, the present invention comprises a valve with metal valve shank of an internal combustion engine, having a tubularly formed valve guide of a sintered body consisting of a partially stabilized zirconium oxide having a porosity less than 3%.

BRIEF DESCRIPTION OF THE DRAWING

The drawing shows a sectional view of a valve housing.

DESCRIPTION OF THE PREFERRED EMBODIMENT

The valve guide of the present invention has excellent wear resistance. As was seen from a comparison test for 100 hours of operation with a valve guide made of Stellite, the wear of a valve guide of partially stabilized zirconium oxide having a porosity of 1.4% is about 50 times lower. Also, the phenomenon similar to welding, as observed between metallic friction partners, occurs only minimally with the inventive stabilized zirconium, as is the residue formation of the combustion gases. Thus, the valve guide according to the invention is particularly suitable for use in an exhaust gas turbocharger.

As used herein, partially stabilized zirconium oxide means a zirconium oxide which possesses a homogeneous structure and is formed by grains in the cubic modification in which tetragonal precipitations are present. Hence a body of such a partially stabilized zirconium oxide is not to be confused with bodies which also consist of zirconium oxide and which are used as the so-called refractories especially in melting metals, but which have a much higher porosity, exhibit a very low strength and whose most outstanding property is a pronounced stability to temperature changes.

Although the wear resistance of partially stabilized zirconium oxide with a relatively low porosity of less than 3% had been known for some time from DE-PS No. 23 07 666, the outstanding properties of a valve guide consisting of partially stabilized zirconium oxide are surprising inasmuch as not only does one confront a friction pairing under high thermal stress, but also, the wear reducing lubrication customary for other friction partners is eliminated between the valve guide and valve shank.

In the known valve guides, the removal of the heat absorbed from the combustion chamber into the cooled cylinder head is good due to the high thermal conductivity of the metals used. Because of this and the metals used have a very high bending strength, the known metallic valve guides suffer only minimally from thermally induced strains. Partially stabilized zirconium oxide has entirely different physical properties, namely, a relatively high thermal expansion (only about 10% lower than e.g., steel), but at the same time, a very low thermal conductivity, which at about 2.5 W/(m·K) is about 10 to 20 times lower than in the usual steel grades. Since partially stabilized zirconium oxide also has a much lower bending strength than the metals used heretofore, stress cracks of the valve guide were to be expected as a result of its extremely unfavorable combination of thermal properties for the present purpose of use. This was particularly so because of the strong temperature gradient prevailing inside the valve guides in internal combustion engines. In high compression gasoline engines, temperatures of about 1000° C. occur in the region near the combustion chamber, while at the other end of the valve guide, the temperature measures 150° C. Also, in comparison with other known ceramic materials, the use of partially stabilized zirconium oxide was not exactly obvious, as its hardness is substantially less than the hardness of others, e.g., aluminum oxide or silicon carbide. Actually, one would expect partially stabilized zirconium oxide, provided it was otherwise suitable, to exhibit relatively little reduced wear. Thus, the excellent performance observed for partially stabilized zirconium oxide with a porosity of less than 3%, and preferably less than 1.5%, in such valves is completely unexpected.

The advantage of the present invention resulting from the high linear thermal expansion of partially stabilized zirconium oxide is that the valve guide of the invention can be secured in the cylinder head or in an exhaust gas turbocharger by shrink-fitting. As compared with other ceramic materials, there is no danger that when the temperature rises during engine operation, expansion of the valve guide would be less than, e.g., the cylinder head and resulting in loosening of the valve guide. Of course, the inventive valve guide may also be installed by gluing or mechanical clamping.

In a preferred form of the present invention, the valve guide is a sintered body consisting of zirconium oxide which is partially stabilized with one or more oxides of magnesium, calcium, or yttrium. Magnesium oxide is especially preferred, in particular, in a quantity of 2.7 to 3.2 wt. %, based on the zirconium oxide. Zirconium oxide partially stabilized with magnesium oxide in this quantity exhibits maximum strength and hence wear resistance.

Apart from the type of stabilization agent used, the degree of stabilization of the zirconium oxide depends on the process conditions, e.g., sintering times, sintering temperature, cooling rates and grain size of the zirconium oxide. It is perfectly possible to vary several of the parameters which determine the degree of stabilization of the zirconium oxide and thereby achieve the same degree of stabilization. For the purposes of the present invention, an especially suitable partially stabilized zirconium oxide is one wherein the proportion of the cubic modification of the zirconium oxide is not greater than 80 wt. %, while the proportion of the tetragonal modification is between 20 and 60 wt. % and the proportion of the monoclinic modification is not greater than 6 wt. %, the proportions of the individual modifications making up 100 wt. %.

To achieve especially low wear behavior, in a further embodiment of the invention, is wherein the bore of the valve guide is treated so that it has a centerline average roughness $R_a$ of less than 1 μm and preferably from 0.03 to 0.1 μm. The partially stabilized zirconium oxide used according to the present invention having a porosity of less than 3%, offers the advantage that it can be machined to a much more uniform and finer surface by the usual methods of surface treatment than aluminum oxide, silicon nitride or silicon carbide can be.

Although it is not yet fully understood to what the excellent properties of the valve guide of the invention can be attributed, it may be that the high strength of this material, measured as the ultimate bending strength $\sigma_B$ is responsible. An especially suitable material for the present invention is a partially stabilized zirconium oxide which has a bending strength of at least 400 MPa.

The figure shows in a sectional view a part of a valve housing 3 for an exhaust gas turbocharger (not shown). As shown, a metallic valve shank 2 is arranged in a valve guide 1 of partially stabilized zirconium oxide, where the valve guide is completely covered by the metal of the component embracing it in the area where it is impacted by the flowing exhaust gases.

The partially stabilized zirconium oxide involves a zirconium oxide stabilized with 2.9 wt. % magnesium oxide and having a porosity of 1% and a bending strength $\sigma_B = 490$ MPa. The bore of the valve guide has a centerline average roughness $R_a$ of 0.07 micron. The various inventive $ZrO_2$-modifications were measured by X-ray diffraction method on surfaces with a mirror bright finish.

EXAMPLES

Tests were conducted on test stands utilizing the so-called "Düsseldorf Test". The test engines were run utilizing a variety of valve guides and the wear measurements in connection with the guides were observed.

Test A

Duration of running time: 116 hours
(chrome-plated valve shaft in a relief valve of a turbo-supercharger, valve guide of partially stabilized zirconium oxide, engine - USA construction, lambda probe - controlled, i.e., higher operating temperatures.

The wear measurement figures were as follows:
top—5 mm from upper edge
middle—30 mm from upper edge
bottom—5 mm from lower edge.
Wear values:
top—122 μm
middle—12 μm bottom—2 μm

Test B

Duration of running time: 148 hours (boron-treated valve shaft in a valve guide of partially stabilized zirconium oxide in a relief valve of a waste gas turbo-supercharger in connection with a European made engine.

Wear values:
top—3 μm
middle—0 μm
bottom—0 μm

A comparison test with a mass-produced valve guide of stellite yielded the following wear values:
top—1.140 μm
middle—378 μm
bottom—232 μm

Test C

In an actual vehicle test over 9,000 km, the following wear values with the engine described under Test B and a valve guide of partially stabilized zirconium oxide were obtained:

Wear values:
top—34 μm
middle—4 μm
bottom—0 μm

This data clearly shows the superior performance of valve guides in accordance with the present invention.

We claim:

1. In an internal combustion engine wherein a tubularly formed valve guide is formed with a bore for a metal valve shank said valve guide being encircled by a component embracing it in at least an area where it is exposed to exhaust gases, the improvement which comprises the valve guide being a sintered body consisting of partially stabilized zirconium oxide having a porosity less than 3%, and composed of up to 80 wt. % cubic modification, between 20 and 60 wt. % tetragonal modification, and up to 6 wt. % monoclinic modification, the sum of the amount of the various modifications being 100 wt. %, wherein the partially stabilized zirconium oxide has a homogenous structure and is formed by grains in the cubic modifications in which tetragonal precipitations are present.

2. The valve guide of claim 1 wherein the zirconium oxide is partially stabilized with one or more oxides selected from the group of magnesium, calcium, and yttrium.

3. The valve guide of claim 1 wherein the bore of the valve guide has a centerline average roughness $R_a$ of less than 1 micron.

4. The valve guide of claim 3 wherein the bore of the valve guide has a centerline average roughness $R_a$ of 0.03 to 0.1 micron.

5. The valve guide of claim 2 wherein the bore of the valve guide has a centerline average roughness $R_a$ of less than 1 micron.

6. The valve guide of claim 5 wherein the bore of the valve guide has a centerline average roughness $R_a$ of 0.03 to 0.1 micron.

7. The valve guide of claim 1 wherein the bending strength $\sigma_B$ of the partially stabilized zirconium oxide is at least 400 MPa.

8. The valve guide of claim 2 wherein the bending strength $\sigma_B$ of the partially stabilized zirconium oxide is at least 400 MPa.

9. The valve guide of claim 4 wherein the bending strength $\sigma_B$ of the partially stabilized zirconium oxide is at least 400 MPa.

10. The valve guide of claim 5 wherein the bending strength $\sigma_B$ of the partially stabilized zirconium oxide is at least 400 MPa.

11. The valve guide of claim 6 wherein the bending strength $\sigma_B$ of the partially stabilized zirconium oxide is at least 400 MPa.

12. In a valve guide for a blow-off valve of an exhaust gas turbocharger, the improvement which comprises the valve guide being a sintered body consisting of partially stabilized zirconium oxide having a porosity less than 3%, and composed of up to 80 wt. % cubic modification, between 20 and 60 wt. % tetragonal modification, and up to 6 wt. % monoclinic modification, the sum of the amounts of the various modifications being 100 wt. %, wherein the partially stabilized zirconium oxide has a homogenous structure and is formed by grains in the cubic modification in which tetragonal precipitations are present.

13. The valve guide of claim 12, wherein the zirconium oxide is partially stabilized with one or more oxides selected from the group of magnesium, calcium, and yttrium.

14. The valve guide of claim 12, wherein the bore of the valve guide has a centerline average roughness $R_a$ of less than 1 micron.

15. The valve guide of claim 14, wherein the bore of the valve guide has a centerline average roughness $R_a$ of 0.03 to 0.1 micron.

16. The valve guide of claim 13 wherein the bore of the valve guide has a centerline average roughness $R_a$ of less than 1 micron.

17. The valve guide of claim 16, wherein the bore of the valve guide has a centerline average roughness $R_a$ of 0.03 to 0.1 micron.

18. The valve guide of claim 12, wherein the bending strength $\sigma_B$ of the partially stabilized zirconium oxide is at least 400 MPa.

19. The valve guide of claim 13, wherein the bending strength $\sigma_B$ of the partially stabilized zirconium oxide is at least 400 MPa.

20. The valve guide of claim 15, wherein the bending strength $\sigma_B$ of the partially stabilized zirconium oxide is at least 400 MPa.

21. The valve guide of claim 16, wherein the bending strength $\sigma_B$ of the partially stabilized zirconium oxide is at least 400 MPa.

22. The valve guide of claim 17, wherein the bending strength $\sigma_B$ of the partially stabilized zirconium oxide is at least 400 MPa.

* * * * *